(12) United States Patent
Snaper

(10) Patent No.: US 6,241,878 B1
(45) Date of Patent: Jun. 5, 2001

(54) SELF-PURGING IN-LINE FILTER

(76) Inventor: Alvin A. Snaper, 2800 Cameo Cir., Las Vegas, NV (US) 89107

(*) Notice: Subject to any disclaimer, the term of this patent is extended or adjusted under 35 U.S.C. 154(b) by 0 days.

(21) Appl. No.: 09/518,017

(22) Filed: Mar. 3, 2000

(51) Int. Cl.$^7$ .................................................. B01D 35/06
(52) U.S. Cl. ........................ 210/99; 210/106; 210/306; 210/407; 210/456; 210/459; 210/510.1
(58) Field of Search ........................ 210/99, 106, 243, 210/306, 320, 321.69, 785, 407, 408, 446, 510.1, 384, 388, 456, 459

(56) References Cited

U.S. PATENT DOCUMENTS

| | | | |
|---|---|---|---|
| 2,087,385 | * | 7/1937 | Naujoks . |
| 3,305,481 | * | 2/1967 | Peterson . |
| 3,463,321 | * | 8/1969 | Van Ingen . |
| 4,279,751 | * | 7/1981 | Fishgal . |
| 4,904,394 | * | 2/1990 | Clarke et al. . |
| 5,053,141 | * | 10/1991 | Laiho . |
| 5,997,744 | * | 12/1999 | Limaye . |

* cited by examiner

Primary Examiner—Joseph W. Drodge
Assistant Examiner—Terry K. Cecil
(74) Attorney, Agent, or Firm—Donald D. Mon

(57) ABSTRACT

Described is a self-cleaning filter for a liquid stream confined in a pipe 20. The filter includes a porous ceramic filter body 30 having a power source 35 attached thereto. Upstream from the filter body a helical rib 50 and a sump drain tube 42 are provided. In operation, as the filter becomes clogged, an electrical current is applied causing the ceramic body to exhibit ultrasonic transducer properties which dislodge particulates from its upstream face 31. At the same time, a sump valve 41 is opened to remove the particulate-rich liquid. The helical rib imparts a rotary motion which creates a rotary flow component across the upstream face of the filter.

5 Claims, 1 Drawing Sheet

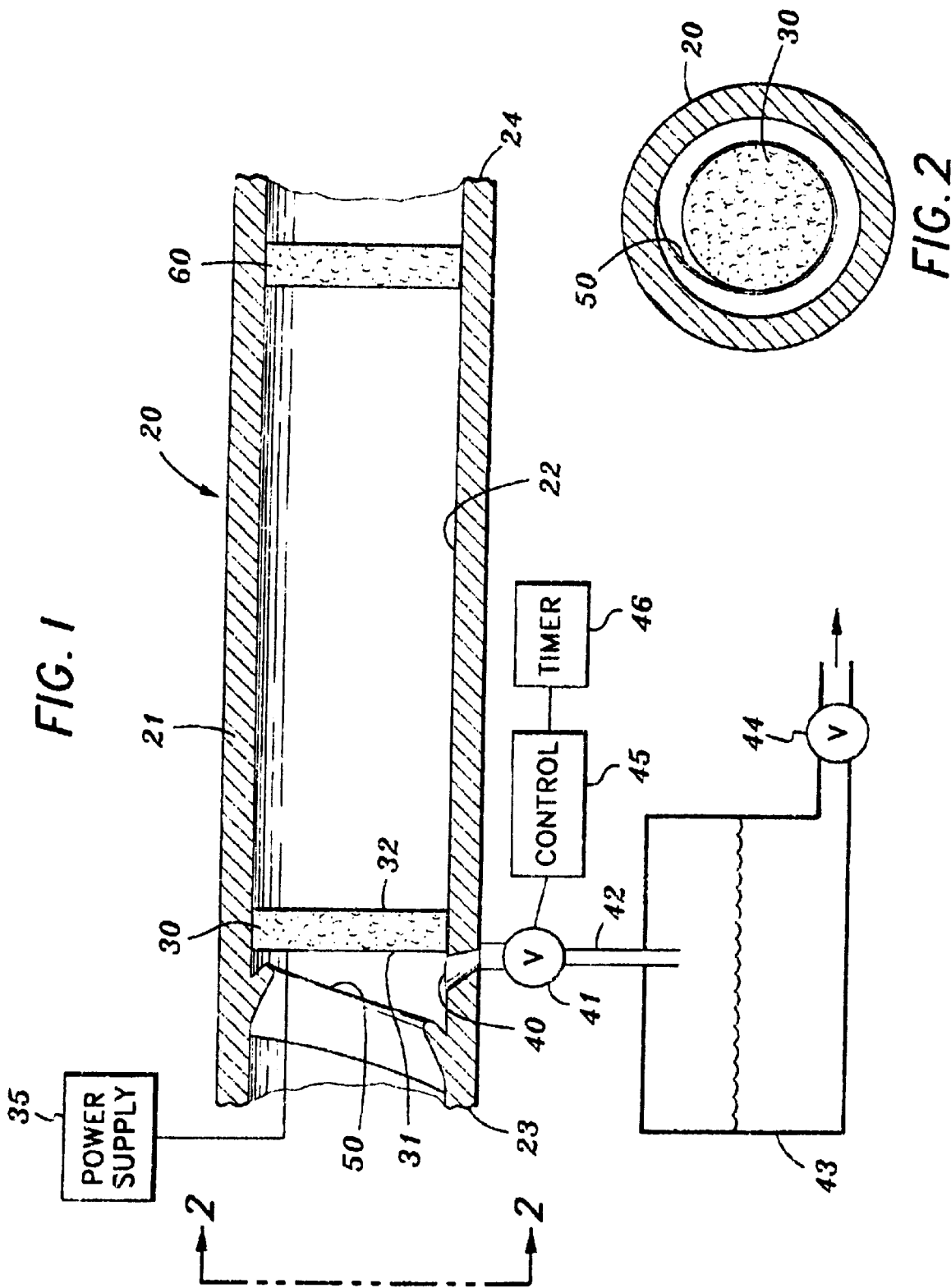

SELF-PURGING IN-LINE FILTER

FIELD OF THE INVENTION

A porous piezoelectric in-line filter in a pipeline liquid stream. Its piezoelectric effect is supplemented by a periodic flow across the surface of the filter to remove particulates which are displaced from the surface of the filter and from the stream.

BACKGROUND OF THE INVENTION

Especially for viscous liquids such as fuel oil, it is prudent practice to remove non-combustible particulates before storing the liquid, and especially before feeding it to a combustion system. In-line filters have long been used for this purpose. The advantages of fine filtering of other liquids such as water and solvents are also well-known, and such applications are contemplated herein.

The potential disadvantages of in-line filters are well-known, and are largely centered on the ultimate reduction of efficiency caused by the plugging of the filter pores, and the difficulty of removing the separated particulates from a closed system. One common technique is to provide two filters in parallel circuitry with one another. While one side is open to filtered flow, the other side is closed and back-washed. It is, of course, also possible to shut down a system for backwash and purge of particulates at the cost of down time. The saving of downtime is reduced by the cost of duplicating filtration facilities.

It is an object of this invention to provide a porous ceramic filter which by its own vibrations can release from its surface the particulates that are detained by it, to provide a swirling motion in the stream to sweep the filter surface, and to provide a periodically actuated purge circuit to remove particulates from the stream just upstream from the filter surface.

BRIEF DESCRIPTION OF THE INVENTION

A self-cleaning porous filter for a liquid stream confined in a pipe. The filter extends across the flow area. It is a ceramic of the type which upon appropriate excitation acts as an ultrasonic transducer. A power supply applies power to cause the vibration and dislodge particulates from the surface of the filter. A rib in the inside wall of the pipe provides a laminar swirl to the outer boundary of the liquid stream so part of it sweeps across the filter face.

A sump valve opens into the pipe immediately upstream from the filter face. It is periodically opened while the filter is actuated to remove a local quantity of particulate-laden liquid and discharge it into a sump.

The pores of the filter are selected to retain particulates of a specified size, and the power supply and sump valve are actuated when the pressure drop caused by plugging of the pores exceeds a premissible value, which indicates that it is time to clean the pores.

The above and other features of this invention will be fully understood from the following detailed description and the accompanying drawings, in which:

BRIEF DESCRIPTION OF THE DRAWINGS

FIG. 1 is a schematic axial cross-section showing in the invention; and

FIG. 2 is an end view taken at line 2—2 in FIG. 1.

DETAILED DESCRIPTION OF THE INVENTION

FIG. 1 shows a segment of pipe 20 with a wall 21 having a cylindrical inner surface 22. Liquid flow is from the inlet end 23 to the outlet end 24, namely to the right in FIG. 1. This pipe segment is plumbed into any pipe system from which particulates are to be filtered.

While a fuel oil system will be one of the principal uses for this filter, it is also effective for the filtration of other liquids of widely varying viscosities and types. For example water and coolant liquids such as glycols, can readily be treated with this device.

A ceramic filter 30 is fixed inside the pipe. It extends across the interior flow area so that all liquid must pass through it to remove entrained particulates. It is a feature of this invention that this porous filter is made of a porous poled piezoelectric and electrostrictive ceramic. Examples are barium titanate and lead zirconate.

The filter has an upstream face 31 and a downstream face 32, and a dimension of thickness. Its pores are interconnected to provide passages for flow through the filter.

An external power supply 35 is connected to the filter to cause the filter itself to act as an ultrasonic transducer and have mechanical vibration. The power supply functions at a low voltage to drive the filter as a transducer at frequencies between about 20 to about 40 KHz. Such power supplies are well-known in the piezoelectric art. The porous structure filters out small particles larger than the pores, and many interconnected channels or pores in series must be traversed by the liquid to transit the filter. The actuating energy is focused on the upstream face, although the entire body will vibrate.

The power supply is actuated periodically. It is provided with controls (not shown) to regulate its operation. The transducer effect is not used during routine filtration. Instead, as the filtering proceeds the pores begin to fill, especially on the upstream face. When the pressure drop across the filter exceeds an acceptable amount showing that the filter is becoming undesirably plugged, the piezoelectric effect will be provided as discussed below.

The retained particulates on and near the upstream face of the filter can be dislodged by the piezoelectric vibrations. They will be displaced upstream a relatively short distance which clears the pores. However, this is of little value if the particulates are once again deposited on the filter once the vibrations are discontinued.

This disadvantage is overcome by providing a circular laminar flow near the upstream face of the filter. This flow will tend to move the liquid and particulates which are closely adjacent to the upstream face outwardly toward the inside wall surface, where an inlet opening 40 to a sump valve 41 is located. A drain 42 from the sump valve leads to a sump 43. The sump has a drain valve 44 for emptying it. A control 45 and an optional timer 46 will be provided to open sump valve 41. This control may also be used to actuate the power supply simultaneously.

To encourage flow into the opening 40, circular laminar flow is produced by a thread-like helical rib 50 on the inside wall surface near the upstream face of the filter. While the central portion of the stream flow does not impinge on this rib, the outer cylindrical part of the flow is contacted by it, and it provides a rotary motion which tends to create a small but important rotary flow component across the upstream face of the filter. This flow goes outwardly toward the sump valve opening, so that the sump valve when open receives a particulate-rich flow of liquid from the region immediately upstream from the upstream face of the filter. The substantial but brief pressure drop across the sump valve assures a quick withdrawal of the localized liquid/particulate fluid, with minimal interruption of the main liquid flow.

In routine operations the filter will not act as a transducer. The power supply will be off, and the sump valve will be closed. The swirl produced by the deflector will not adversely affect the filter. In fact, it may improve it by keeping some of the particulates moving across the upstream face, rather than plugging it.

In time, however, the pores will start to fill and the pressure drop across the filter will be excessive. At that time the power supply will cause the filter to vibrate and act as a transducer which will tend to dislodge the particulates from the pores. The sump valve is opened, and the sweeping effect already described will move liquid adjacent to the filter toward the opening, carrying the particulates with it and out through the sump valve. This action will be continued for as long as necessary, but in most applications will require no more than a few seconds about every five minutes. The total flow into the sump is a minor amount, and the major flow through the filter can be continued. It is not necessary to shut down the major flow for this flushing operation.

It will be noted that between times when the sump valve is opened, the particles which are not retained on the filter will circulate next to the filter and tend to be caught in the swirl, so as not be carried back up the feed line.

The mass of fuel which is diverted to the sump is relatively small and is quite rich in particulates. After an off-line treatment to remove them, the liquid can be returned to the system on either side of the filter.

If desired a secondary filter 60 may be placed in the pipe downstream from the first filter. While it could be equipped as above, it may instead be a passive filter element of any type. Because of the upstream filtration, only an occasional replacement will ordinarily be necessary because so few particulates will impinge on it.

The characteristics of the filter will be selected with regard to the degree of clarification desired, the rate of flow, and the amount of tolerable pressure drop. The pressure drop across this type of filter is related to the viscosity of the liquid, the flow rate imposed on the filter, the effective filter length, and the apparent pore diameter. All of these are independently selectible, and the characteristics of the filter will be designed for the intended application.

For example, for one suitable 10 inch diameter disc-shaped filter the total pore sectional area will be about twice the disc area, and the effective length of each pore will be about 0.005 inches or less. The pore sectional area of about 1.1 square feet will cause a pressure drop of about 75 psi at a flow rate of about 135 gallons per minute in a light-weight oil.

The area of the filter is substantially larger than the total pore sectional area. For a maximum loading of 5 mg/cm2, the quantity of trapped solids in a cycle will often be about 26 grams. Then for a flow rate of about 135 gpm and 10 mg/l of solids, the flushing operation will be used about every five minutes.

The manufacture of porous ceramics to closely controlled pore sizes is well-known, and such ceramics are readily available. For this reason a detailed description of their manufacture is not given here.

This invention is not to be limited by the embodiment shown in the drawings and described in the description, which is given by way of example and not of limitation, but only in accordance with the scope of the appended claims.

I claim:

1. In combination:

a pipe having a circularly cylindrical inside wall defining a flow passage from an inlet end to an outlet end;

a filter extending across said passage, said filter comprising a porous ceramic body having an upstream face and a downstream face, pores in said body forming a dimensionally restricted passage from face to face to retain particulates on said upstream face and permit filtered flow of liquid through said body, said pores being dimensioned to retain particulates larger than a predetermined size, said pipe having an opening through its wall, which opens adjacent to said upstream face;

said body being constructed of a ceramic which upon application of an electrical current and frequency will exhibit ultrasonic transducer properties to dislodge particulates from said pores;

a power supply connected to said body to exert said current on said body;

a helical rib in said flow passage on said inside wall adjacent to said filter and upstream from its upstream face, extending radially partway into said flow passage;

a sump valve adapted selectively to be opened to flow and closed to flow, said sump valve including a drain, said sump valve receiving liquid from said opening and discharging liquid to a sump through said drain;

whereby, when said filter is clogged to an unacceptable amount, said power supply can be actuated and said sump valve can be opened to remove a quantity of particulate-rich liquid from the region immediately adjacent to said upstream face of said filter.

2. A combination according to claim 1 in which said ceramic body exhibits piezoelectric properties when said current is applied to it.

3. A combination as in claim 1 in which said helical rib terminates adjacent to said upstream face.

4. A combination according to claim 3 in which said power supply and sump valve are adapted to be actuated simultaneously.

5. A combination according to claim 4 in which said power supply and sump valve are actuated when the pressure drop across said filter exceeds an acceptable amount.

* * * * *